F. P. DUNN.
SCALE.
APPLICATION FILED JAN. 20, 1910.
1,001,002.
Patented Aug. 22, 1911.
3 SHEETS—SHEET 1.
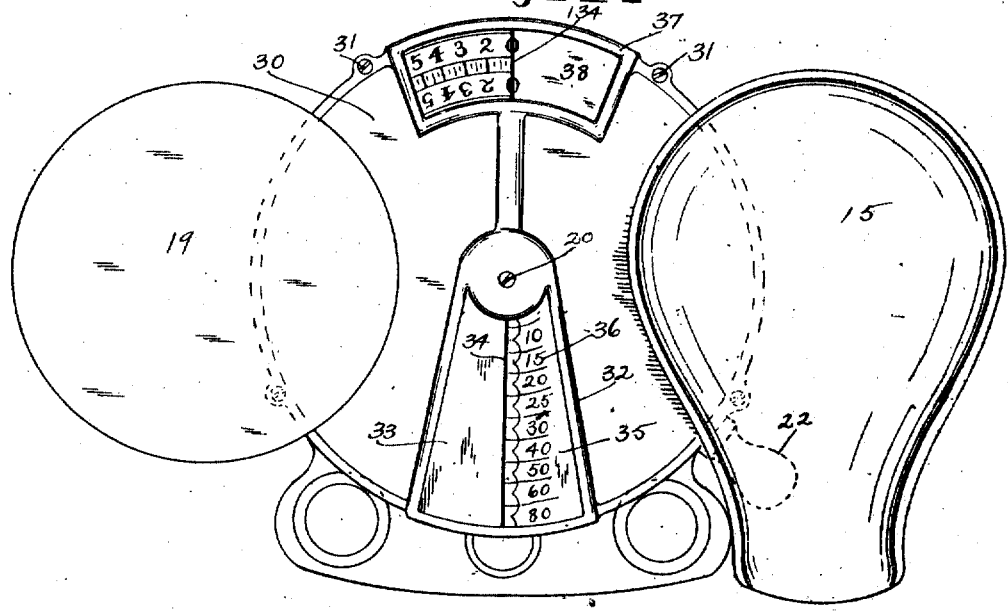
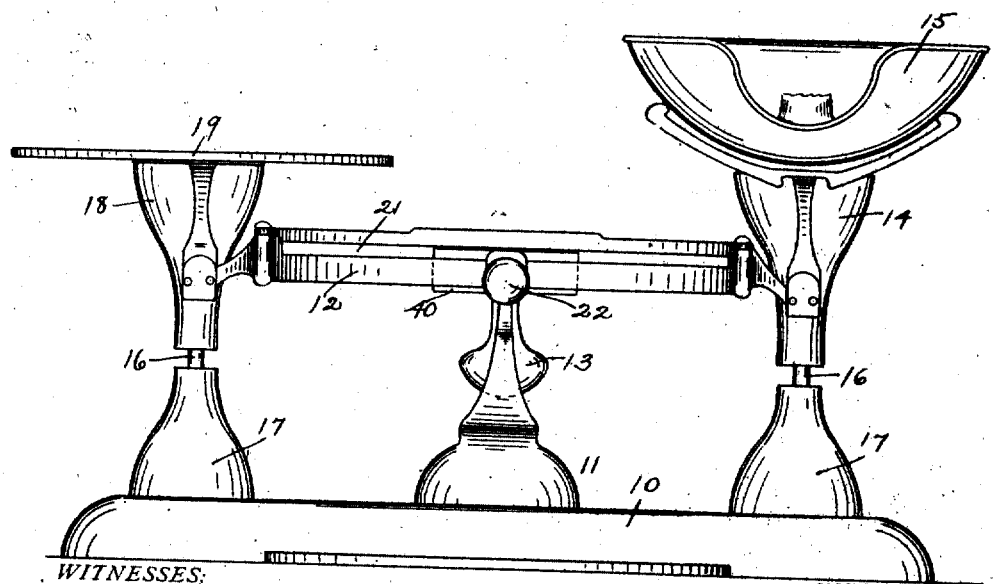
WITNESSES:
G. H. Poink
O. M. McLaughlin
INVENTOR.
Frank P. Dunn.
BY
V. H. Lockwood
ATTORNEY.

F. P. DUNN.
SCALE.
APPLICATION FILED JAN. 20, 1910.

1,001,002.

Patented Aug. 22, 1911.

3 SHEETS—SHEET 2.

WITNESSES:
G. H. Boink
O. M. McLaughlin

INVENTOR.
Frank P. Dunn.
BY
H. Lockwood
ATTORNEY.

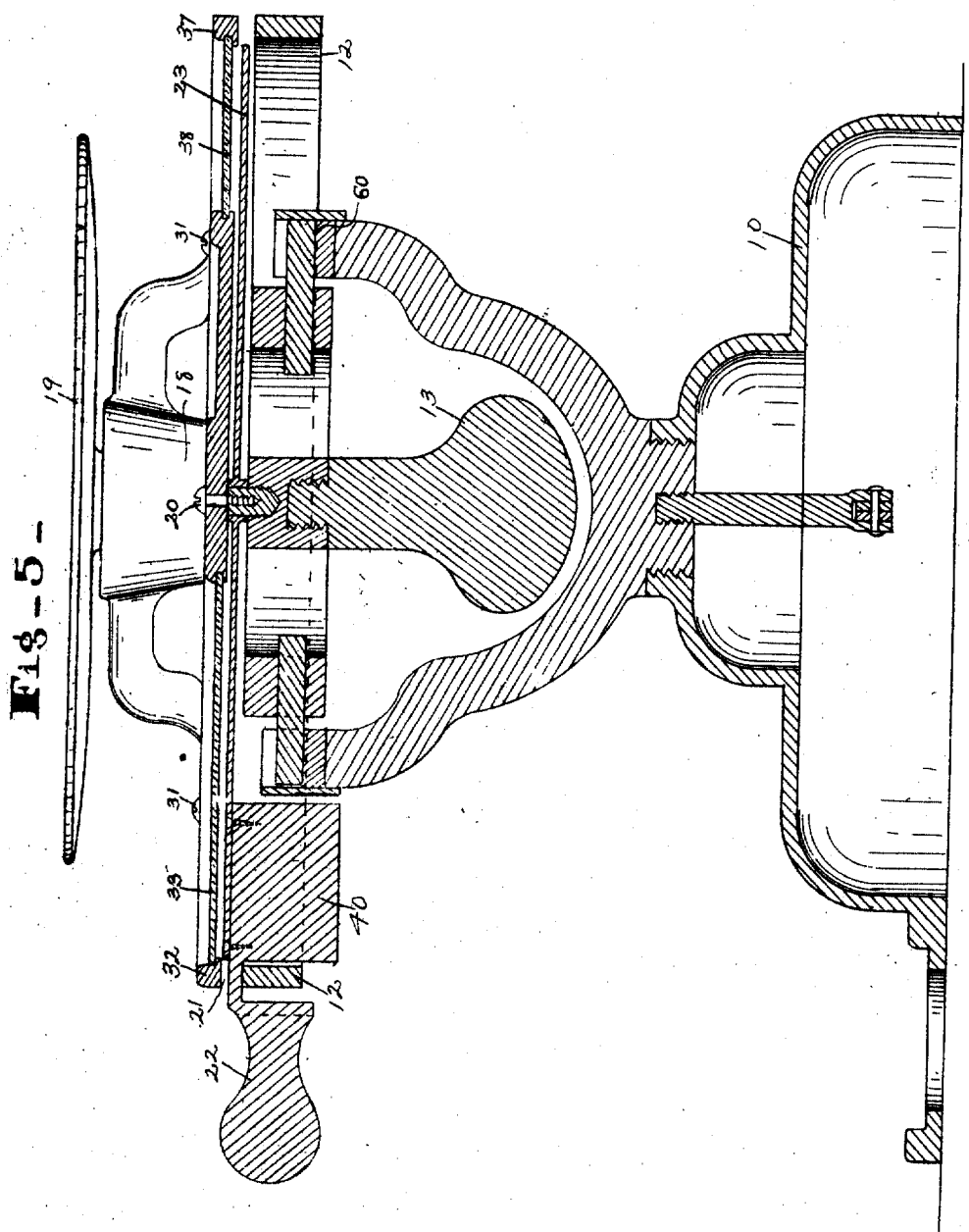

UNITED STATES PATENT OFFICE.

FRANK P. DUNN, OF ANDERSON, INDIANA, ASSIGNOR, BY DIRECT AND MESNE ASSIGNMENTS, OF ONE-FOURTH TO GEORGE P. LOUISO, OF ANDERSON, INDIANA, AND THIRTY ONE-HUNDREDTHS TO THE ANDERSON TOOL COMPANY, OF ANDERSON, INDIANA, A CORPORATION OF INDIANA.

SCALE.

1,001,002.   Specification of Letters Patent.   Patented Aug. 22, 1911.

Application filed January 20, 1910. Serial No. 539,043.

*To all whom it may concern:*

Be it known that I, FRANK P. DUNN, of Anderson, county of Madison, and State of Indiana, have invented a certain new and useful Scale; and I do hereby declare that the following is a full, clear, and exact description thereof, reference being had to the accompanying drawings.

The object of this invention is to provide a new and improved style of computing scale, particularly of the even balanced beam type and is an improvement on or modification of the scale shown in my application Serial No. 535,596, filed Dec. 30, 1909.

The poise is combined with the member of the indicating means which contains the table of total values, weights and the like, so that said movable member of the indicating means may be said to be the poise and the poise may be said to be the movable member of the indicating means.

In this improved scale the indicator is stationary while the member of the indicating means which contains the total values and their graduations is movable or oscillatory. The indicator is fixed on the beam so as to be, in a sense, a part thereof and is preferably in the form of a casing in which the movable member oscillates.

The movable member of the indicating means is preferably a circular disk with a combined poise and handle secured to one edge thereof and with an indicating card containing two separate groups of indications, one group adjacent to said handle or poise that is arranged fan-shaped or segmental and has total value graduations and indications. At the other side there is an oppositely opposed and arranged series of indications for indicating ounces and it has two sets of numerals which can be read from opposite standpoints. Hence both salesman and the purchaser, from opposite positions, can read the scale.

The nature of the invention will be understood from the accompanying drawings and the following description and claims.

Figure 3:
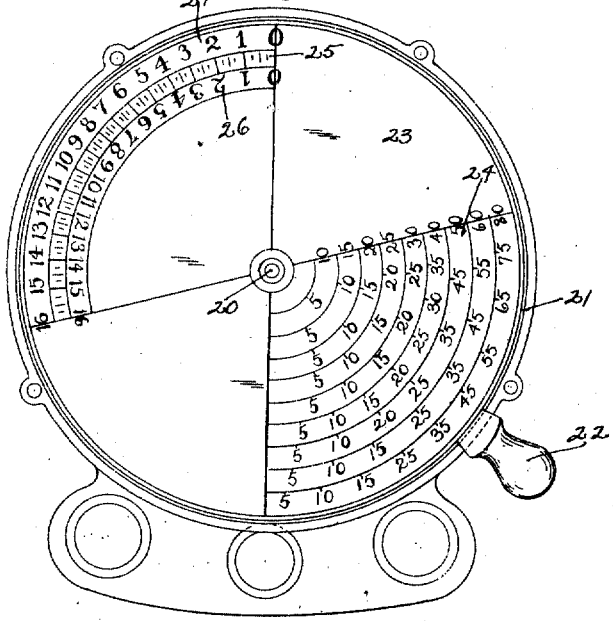
Figure 4:
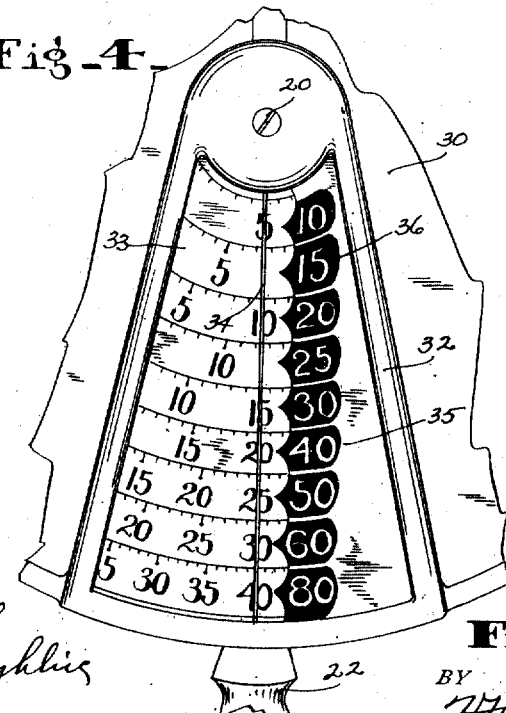

In the drawings Figure 1 is a plan view of the scale. Fig. 2 is a front elevation. Fig. 3 is a plan view of the central portion of the scale showing the movable member of the indicating means, the top and stationary member of the indicating means being removed. Fig. 4 is a plan view of a portion of the top or stationary member of the indicating means and a part of the handle of the movable member thereof, parts being broken away. Fig. 5 is a vertical central transverse section through the machine.

In detail there is shown a scale with a base 10 and central stand 11 on which an even balanced beam 12 is centrally fulcrumed with a central depending or secured counter-balanced weight 13. On the right hand end of said beam there is a load-receiving member 14 carrying a scoop 15 from which a rod 16 extends downwardly through the stand 17 below the base. On the other end of the beam there is mounted a weight-receiving member 18 with a weight pan 19 and also the rod 16 extending downward therefrom.

The central portion of the beam 12 is preferably skeleton-like and circular in form and fulcrumed on a pair of pivots 60 on arms of stand 11. However, it may be fulcrumed in any desired way. It has centrally pivoted on it by the pivot 20 the circular movable member 21 of the indicating means to which the poise 40 and handle 22 are connected. This member of the indicating means is shown best in Fig. 3 where the card 23 is shown forming a part of said indicator. It is a circular card and has two oppositely located sets of indicating numerals and graduations that are segmental in form and a line running through the poise 21 and pivot 20 diametrically passes through the middle of both of the sets of indications. On the side next to the poise the indications 24 represent total values or the like. On the opposite side there is a set of graduations 25 for ounces and fractions thereof, and parallel with it a row of weight numerals 26 readable by the person standing at the side of the scale on which said numerals are located. There is also a row of numerals 27 that are readable from the other side of the scale. The poise is movable away from the load-receiving member and therefore the zero indications on the chart and on the side with the poise are remote from the load-receiving member, while the zero marks on the other side of the chart are nearest the load-receiving member. Hence the poise tends to counterbalance a load put on the load-receiving member.

There is a top circular plate 30 secured upon the central frame of the beam by the pivot screw 20 and other screws 31 so it is fixed to the beam and moves therewith. It has a segmental opening 32 running from the center to the side on which the poise is located that is closed by glass or other transparent material 33 which is marked with an indicating line 34 radially of said plate and transversely of the beam and in the same vertical plane as the beam. Hence the indicating line 34 is fixed. On the right hand side of it there is a plate 35 containing price per unit numerals 36 arranged to register with the rows of total value numerals on the chart below. At the opposite side of the scale there is likewise an opening 37 closed by glass 38 which discloses the weight numerals and graduations on the chart below and has a central indicating line 134 that is in line with the other indicating line 34.

I do not wish to be limited to the details of the construction shown as the particular form of the beam and the members of the indicating means may be varied, but it is necessary that the movable member of the indicating means be pivoted either to the under side of the beam or to the top plate 30, and it is immaterial to which, as they are united together and in a sense constitute the beam.

What I claim as my invention and desire to secure by Letters Patent is:

1. A weighing scale including a beam fulcrumed between its ends, a load receiving member carried by one end of said beam, a tare weight receiving member carried by the other end of said beam, indicating means including a member fixed to said beam and extending transversely thereof and a member oscillatory with relation to said fixed member and provided with total value graduations, and a poise secured to the periphery of said movable member of the indicating means, the zero numerals on said movable member of the indicating means being remote from the load receiving member and the poise being at its limit of movement toward said indicating member when at zero.

2. A weighing scale including a fulcrumed beam, a plurality of fixed indicators transversely of the beam and one provided with price per unit graduations, and a circular movable member of the indicating means centrally pivoted on the beam so as to be oscillatory under said indicator and provided on the two opposite sides thereof with different sets of indications adapted to cooperate with said plurality of indicators.

In witness whereof, I have hereunto affixed my signature in the presence of the witnesses herein named.

FRANK P. DUNN.

Witnesses:
GEORGE P. LOUISO,
MOSES C. RYAN.